United States Patent
Asamarai et al.

(10) Patent No.: US 8,228,668 B2
(45) Date of Patent: Jul. 24, 2012

(54) BALANCED MOMENT LIFT SYSTEM AND METHOD

(75) Inventors: Saeb Asamarai, Columbia Heights, MN (US); Robert W. Fluhrer, Prior Lake, MN (US)

(73) Assignee: Ergotron, Inc., St. Paul, MN (US)

( * ) Notice: Subject to any disclaimer, the term of this patent is extended or adjusted under 35 U.S.C. 154(b) by 1307 days.

(21) Appl. No.: 11/828,866

(22) Filed: Jul. 26, 2007

(65) Prior Publication Data

US 2008/0026892 A1    Jan. 31, 2008

Related U.S. Application Data

(60) Provisional application No. 60/833,503, filed on Jul. 26, 2006.

(51) Int. Cl.
| | |
|---|---|
| G06F 1/16 | (2006.01) |
| H05K 7/00 | (2006.01) |
| H04N 5/64 | (2006.01) |
| F16M 11/00 | (2006.01) |

(52) U.S. Cl. .............. 361/679.05; 361/679.21; 348/836; 248/125.2

(58) Field of Classification Search .......... 348/836–843; 361/679.05, 679.21; 312/312; 248/125.2, 248/125.8, 157, 132
See application file for complete search history.

(56) References Cited

U.S. PATENT DOCUMENTS

| | | | |
|---|---|---|---|
| 1,222,915 A | 4/1917 | Anderson | |
| 1,965,973 A | 7/1934 | Brown | |
| 2,010,214 A | 8/1935 | Braun | |
| 2,168,209 A * | 8/1939 | Haupt | 248/572 |
| 2,178,122 A | 10/1939 | Ostler et al. | |
| 2,471,998 A | 5/1949 | Berggren | |
| 2,480,865 A | 9/1949 | Lofstrand | |
| 2,506,228 A | 5/1950 | Lofstrand | |
| 2,657,925 A * | 11/1953 | Crow | 49/300 |
| 2,876,362 A | 3/1959 | Foderaro | |
| 2,924,411 A | 2/1960 | Rouverol | |
| 3,113,793 A | 12/1963 | Harwood | |
| 3,269,035 A * | 8/1966 | Bong | 434/420 |
| 3,534,935 A | 10/1970 | Gunn | |
| 3,543,282 A | 11/1970 | Sautereau | |
| 3,575,368 A | 4/1971 | Thomas et al. | |
| 3,675,597 A | 7/1972 | Oddsen et al. | |

(Continued)

FOREIGN PATENT DOCUMENTS

DE    1091279    10/1960

(Continued)

OTHER PUBLICATIONS

English-language abstract for DE3406669 (Heckmann).

(Continued)

*Primary Examiner* — Joshua J Michener
*Assistant Examiner* — Ryan Kwiecinski
(74) *Attorney, Agent, or Firm* — Fredrikson & Byron, P.A.

(57) ABSTRACT

A lift system having a first pulley and a biasing member having a first portion operatively coupled to the first pulley. A first tension member can be operatively coupled to the first pulley. The lift system may be configured to provide a constant force to the first tension member during a defined angle of rotation of the first pulley. Such a constant force can be used to counterbalance the weight of a display supported by a stand.

18 Claims, 7 Drawing Sheets

U.S. PATENT DOCUMENTS

| | | |
|---|---|---|
| 3,767,181 A | 10/1973 | Van der Burgt et al. |
| 3,862,734 A | 1/1975 | Buchin et al. |
| 3,890,907 A | 6/1975 | Peterson |
| RE28,767 E | 4/1976 | Kuhlmann et al. |
| 3,976,016 A | 8/1976 | Longbottom |
| 4,215,776 A | 8/1980 | Esler |
| 4,351,245 A | 9/1982 | Laporte |
| 4,357,249 A | 11/1982 | Mellor |
| 4,387,468 A | 6/1983 | Fenne et al. |
| 4,387,876 A | 6/1983 | Nathan |
| 4,389,228 A | 6/1983 | Leunig |
| 4,427,243 A | 1/1984 | Miller |
| 4,494,720 A | 1/1985 | Gregory et al. |
| 4,605,189 A | 8/1986 | Bruneau |
| 4,616,218 A | 10/1986 | Bailey et al. |
| 4,685,648 A | 8/1987 | Dobner et al. |
| 4,690,362 A | 9/1987 | Helgeland |
| 4,691,886 A | 9/1987 | Wendling et al. |
| 4,697,977 A | 10/1987 | Loomer et al. |
| 4,706,920 A | 11/1987 | Ojima et al. |
| 4,751,884 A | 6/1988 | Ball |
| 4,760,622 A * | 8/1988 | Rohrman .................. 16/196 |
| 4,768,762 A * | 9/1988 | Lund ........................ 267/172 |
| 4,836,478 A | 6/1989 | Sweere |
| 4,856,740 A | 8/1989 | MacLeod et al. |
| 4,914,780 A | 4/1990 | Rogers et al. |
| 4,920,381 A | 4/1990 | Mahoney |
| 4,922,836 A | 5/1990 | Damico |
| 4,953,256 A | 9/1990 | Salmela et al. |
| 4,953,748 A | 9/1990 | Wheelock |
| 4,964,152 A | 10/1990 | Kaul et al. |
| 4,964,221 A | 10/1990 | Breyer et al. |
| 5,101,735 A * | 4/1992 | Williams .................. 104/117 |
| 5,143,333 A | 9/1992 | Warden |
| 5,160,104 A | 11/1992 | Sher |
| 5,229,584 A | 7/1993 | Erickson |
| 5,246,191 A | 9/1993 | Moss |
| 5,305,996 A | 4/1994 | Taniwa et al. |
| 5,311,827 A | 5/1994 | Greene |
| 5,400,721 A * | 3/1995 | Greene ...................... 108/147 |
| 5,487,525 A | 1/1996 | Drabczyk et al. |
| 5,520,361 A | 5/1996 | Lee |
| 5,549,264 A | 8/1996 | West |
| 5,589,849 A | 12/1996 | Ditzik |
| 5,626,323 A | 5/1997 | Lechman et al. |
| 5,668,570 A | 9/1997 | Ditzik |
| 5,718,406 A | 2/1998 | Long |
| 5,722,513 A | 3/1998 | Rowan et al. |
| 5,738,316 A | 4/1998 | Sweere et al. |
| 5,743,503 A | 4/1998 | Voeller et al. |
| 5,836,562 A | 11/1998 | Danzyger et al. |
| 5,842,672 A | 12/1998 | Sweere et al. |
| 5,860,370 A | 1/1999 | Poniecki |
| 5,876,008 A | 3/1999 | Sweere et al. |
| 5,881,984 A | 3/1999 | Lin |
| 5,902,201 A | 5/1999 | Vermeer et al. |
| 5,904,328 A | 5/1999 | Leveridge et al. |
| 5,918,841 A | 7/1999 | Sweere et al. |
| 5,924,665 A | 7/1999 | Sweere et al. |
| 5,931,549 A | 8/1999 | Lindberg |
| 5,947,429 A | 9/1999 | Sweere et al. |
| 5,967,479 A | 10/1999 | Sweere et al. |
| 5,992,809 A | 11/1999 | Sweere et al. |
| 6,012,693 A | 1/2000 | Voeller et al. |
| 6,019,332 A | 2/2000 | Sweere et al. |
| 6,026,755 A | 2/2000 | Long |
| 6,064,373 A | 5/2000 | Ditzik |
| 6,189,849 B1 | 2/2001 | Sweere et al. |
| 6,227,518 B1 | 5/2001 | Sun |
| 6,229,584 B1 | 5/2001 | Chuo et al. |
| 6,282,264 B1 | 8/2001 | Smith et al. |
| 6,283,462 B1 | 9/2001 | Emmert |
| 6,286,794 B1 | 9/2001 | Harbin |
| 6,326,955 B1 | 12/2001 | Ditzik |
| 6,378,829 B1 | 4/2002 | Strater et al. |
| 6,411,271 B1 | 6/2002 | Bang et al. |
| 6,418,010 B1 * | 7/2002 | Sawyer .................. 361/679.05 |
| 6,434,851 B1 | 8/2002 | Nishina |
| 6,504,707 B2 | 1/2003 | Agata et al. |
| 6,702,238 B1 | 3/2004 | Wang |
| 6,712,321 B1 | 3/2004 | Su et al. |
| 6,783,105 B2 | 8/2004 | Oddsen, Jr. |
| 6,796,537 B1 | 9/2004 | Lin |
| 6,819,550 B2 * | 11/2004 | Jobs et al. ............... 361/679.22 |
| 6,994,306 B1 | 2/2006 | Sweere et al. |
| 6,997,422 B2 | 2/2006 | Sweere et al. |
| 7,032,870 B2 | 4/2006 | Sweere et al. |
| 7,063,024 B2 | 6/2006 | Latino |
| 7,104,203 B2 | 9/2006 | Lo |
| 7,168,665 B2 * | 1/2007 | Hong et al. ................. 248/125.1 |
| 7,621,490 B2 * | 11/2009 | Tseng ........................ 248/157 |
| 7,789,354 B2 * | 9/2010 | Gan et al. ................... 248/125.8 |
| 2002/0088910 A1 | 7/2002 | Sweere et al. |
| 2002/0100851 A1 | 8/2002 | Abramowsky et al. |
| 2004/0011932 A1 | 1/2004 | Duff |
| 2004/0035243 A1 | 2/2004 | Duval |
| 2004/0035989 A1 | 2/2004 | Sweere et al. |
| 2004/0084585 A1 | 5/2004 | Watanabe et al. |
| 2004/0118984 A1 | 6/2004 | Kim et al. |
| 2004/0250635 A1 | 12/2004 | Sweere et al. |
| 2005/0034547 A1 | 2/2005 | Sweere et al. |
| 2005/0139734 A1 | 6/2005 | Sweere et al. |
| 2005/0145762 A1 | 7/2005 | Sweere et al. |
| 2006/0185563 A1 | 8/2006 | Sweere et al. |
| 2006/0219849 A1* | 10/2006 | Chiu ........................ 248/125.8 |
| 2008/0099637 A1* | 5/2008 | Pai ............................ 248/157 |
| 2011/0155867 A1* | 6/2011 | Griepentrog ............... 248/125.2 |

FOREIGN PATENT DOCUMENTS

| | | |
|---|---|---|
| DE | 1171222 | 5/1964 |
| DE | 1611809 | 1/1971 |
| DE | 3406669 A1 | 8/1985 |
| DE | 3610612 A1 | 10/1987 |
| DE | 19635236 C1 | 3/1998 |
| DE | 29908098 | 9/1999 |
| EP | 0183938 A1 | 6/1986 |
| EP | 0202533 A2 | 11/1986 |
| EP | 1052472 A2 | 11/2000 |
| FR | 0831809 | 1/1938 |
| FR | 2037056 | 12/1970 |
| GB | 0785363 | 10/1957 |
| GB | 2154442 A | 9/1985 |
| GB | 2346071 A | 8/2000 |
| GB | 2338894 A | 12/2000 |
| JP | 2003295161 | 10/2003 |
| TW | 88200746 | 11/1999 |
| WO | 0244609 A1 | 6/2002 |

OTHER PUBLICATIONS

English-language abstract for DE36106129 (Hados Moebelfabrik).
English-language abstract for DE19635236 (Siemens AG).
English-language abstract for FR2037056 (Westinghouse Electric).
English-language abstract for TW88200746 (Lin).
English-language abstract for JP2003295161 (Kato Electric & Machinery).

* cited by examiner

BALANCED MOMENT LIFT SYSTEM AND METHOD

RELATED APPLICATIONS

This application claims the benefit of U.S. Provisional Application Ser. No. 60/833,503, filed Jul. 26, 2006, titled Balanced Moment Lift System and Method, the contents of which are hereby incorporated by reference.

FIELD OF THE INVENTION

The invention relates to balanced moment lift mechanisms useful for supporting displays.

SUMMARY OF THE INVENTION

In some embodiments, the invention includes a lift system having a first pulley having an axis of rotation and a biasing member having a centerline and a first portion operatively coupled to the first pulley. When the first pulley moves the biasing member will deflect, thereby changing its length. A distance between the axis of rotation of the first pulley and the longitudinal centerline of the biasing member will also change. Accordingly, a constant moment output can be created through a defined angle of rotation of the first pulley. A first tension member, such as a cable, can be operatively coupled to the first pulley. In such embodiments, the lift system is configured to provide a constant force to the first tension member during a defined angle of rotation of the first pulley. Such a constant force is useful, for example, for providing a counterbalancing force to a display. Embodiments of the invention also include using such a lift system and a stand with such a lift system in combination with a display.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

The following disclosure discusses lift system systems and methods useful for lifting an object, such as a flat panel display of the type commonly used as television sets and computer screens. Various embodiments of the lift systems discussed herein have several advantages. For example, these lift systems are settable versus adjustable. This refers to the property of the system that allows it to position an object at any suitable location with one hand rather than set into a predefined position using two hands. Second, these systems are easily maneuverable. For example, lift systems in accordance with embodiments of the invention are moveable using less than a predefined percentage of the object weight. For example, in some embodiments, the lift system and object can be maneuvered using a force equal to 10% or less of the weight of the object itself. Third, lift systems in accordance with embodiments of the invention are infinitely adjustable along the range of travel rather than locked into position at a series of predefined points. All of these properties are provided in a lift system that is low cost to produce and highly reliable.

Figure 1:
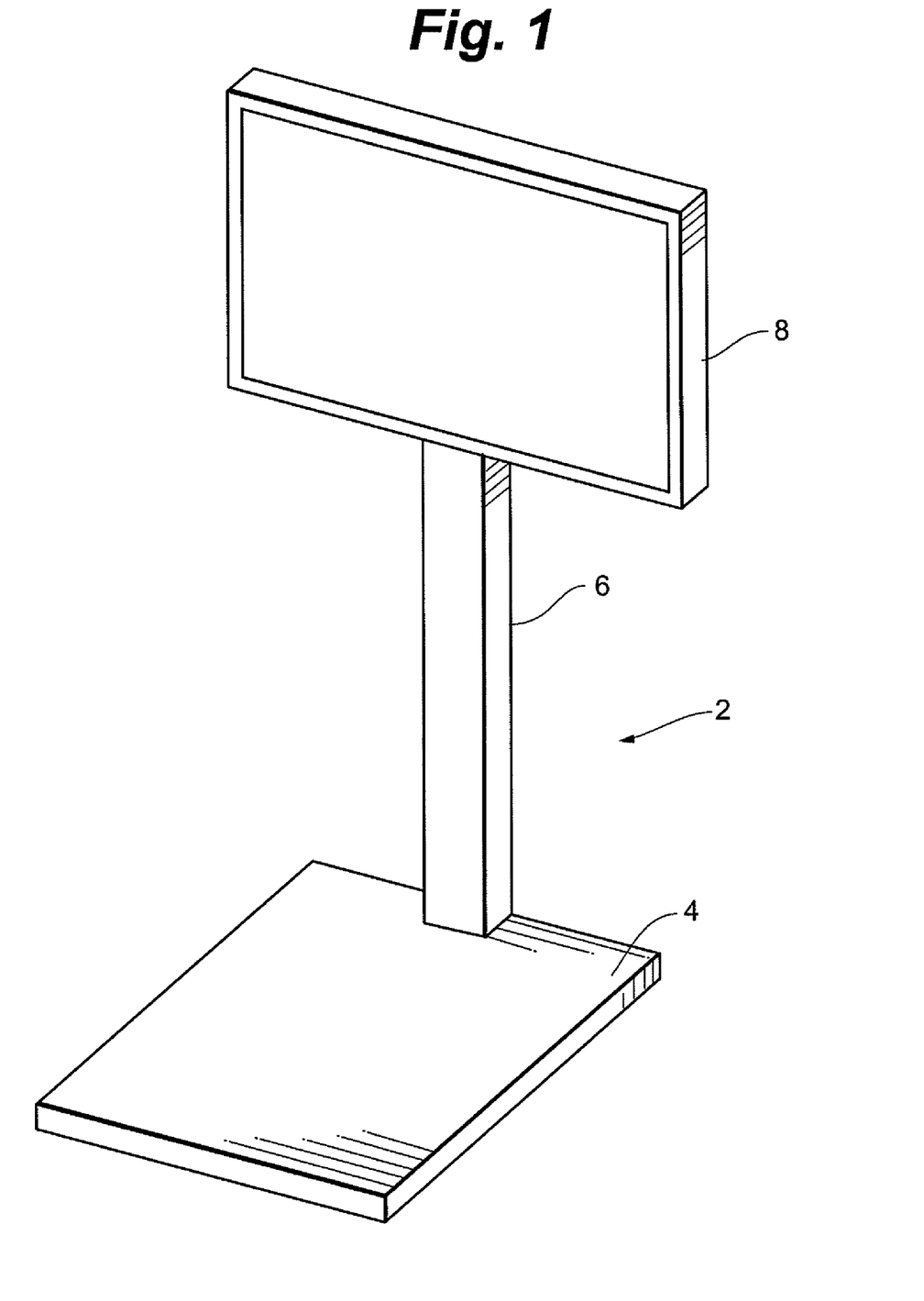
FIG. 1 shows a front perspective view of a display and stand in accordance with an embodiment of the invention.

As shown in FIG. 1, some embodiments of the invention include a stand 2 having a base 4 and a vertical member 6. As shown, one or more displays 8 (e.g., flat panel displays, such as liquid crystal displays (LCDs) or plasma displays) may be coupled the stand 2. It should be noted that, although only one display is shown in FIG. 1, multiple displays (e.g., two or more) can be supported by stand 2. As described further herein, the stand 2 may house a lift system to provide for the display 8 to be set at any point along a range of travel relative to the base in an easily maneuverable manner. For example, the lift system may be housed in a cavity defined by the base 4 of the stand 2.

Figure 2:
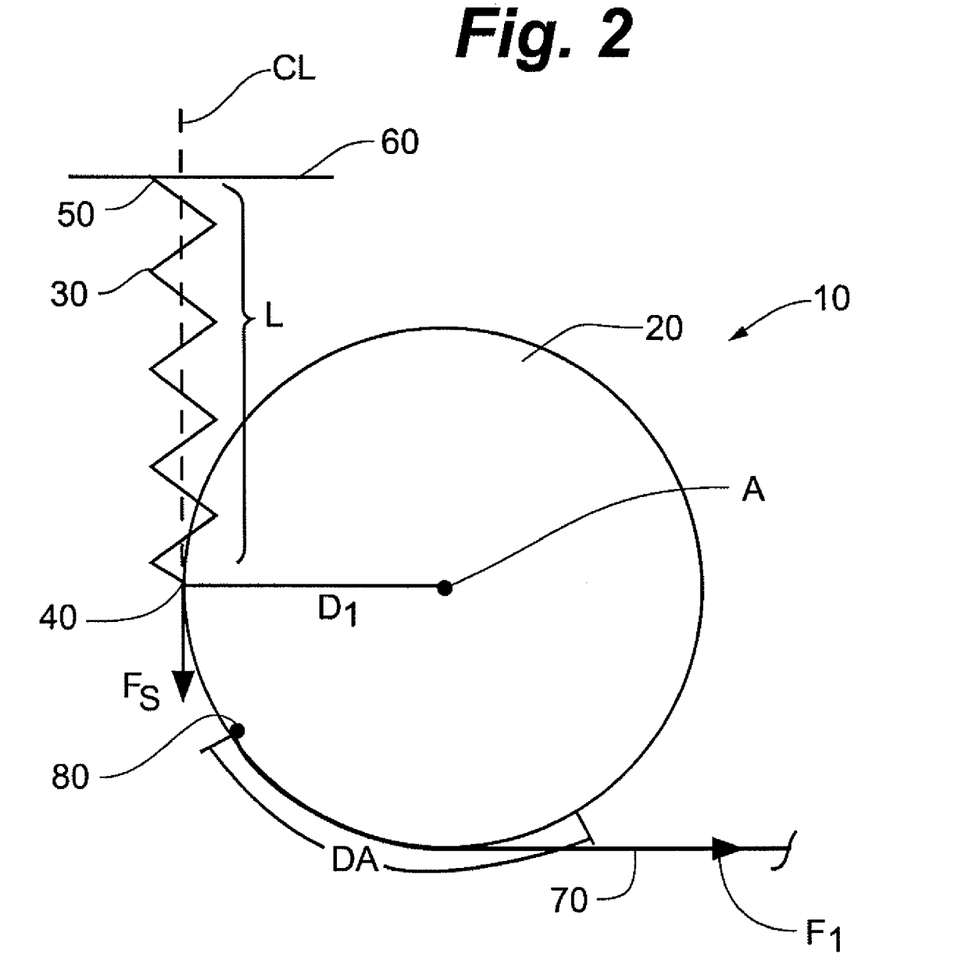
FIG. 2 shows a top plan view of a lift system in a first position in accordance with an embodiment of the invention.
Figure 3:
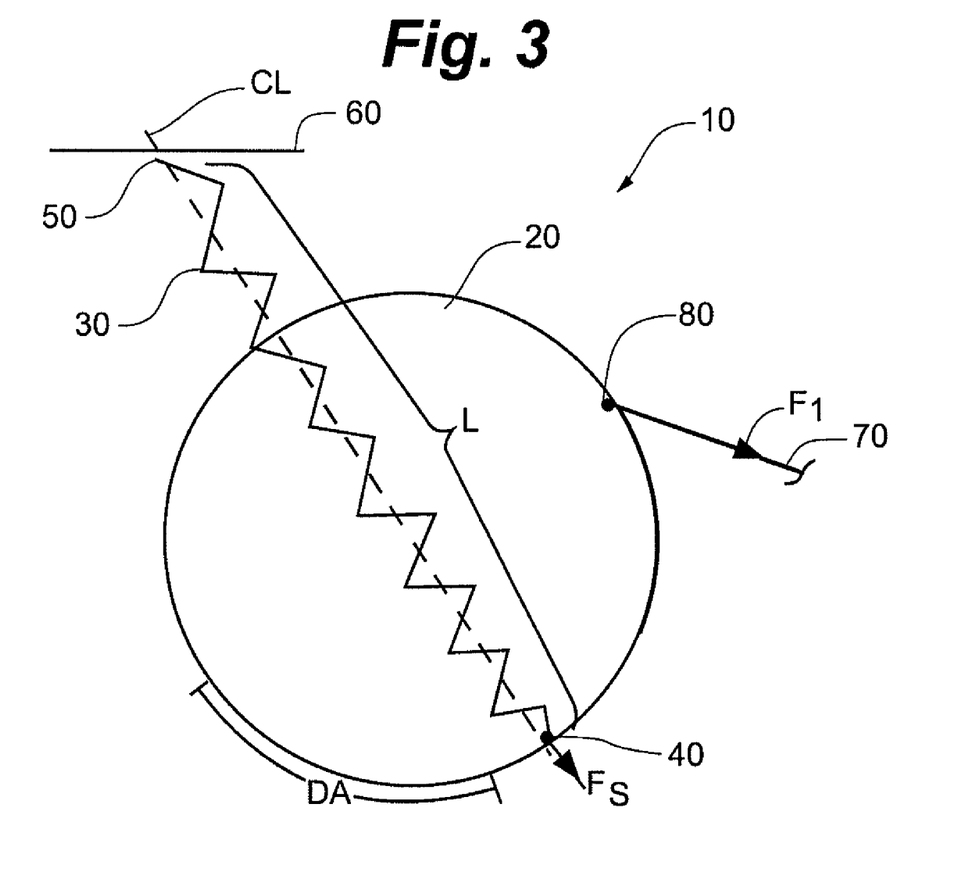
FIG. 3 shows the lift system of FIG. 2 in a second position in accordance with an embodiment of the invention.

In some embodiments, such as the embodiment shown in FIGS. 2 and 3, the lift system 10 includes a first pulley 20 having an axis of rotation A and a biasing member 30 (e.g., a spring, such as an extension spring) with a first portion 40 (e.g., a first end) operatively coupled to the first pulley 20. "Operatively coupled," as used herein, can include, for example, clamps, screws, adhesives and/or integral formation for a direct type coupling, or the use of various spacers, trucks and/or brackets for a more indirect type coupling. In some embodiments, the biasing member is coupled proximate an outer circumference of the pulley. The biasing member 30 may have a second portion 50 operatively coupled to a support 60 (e.g., a fixed member coupled to the stand, a housing fixed member, or wall). In some embodiments, the biasing member is free to pivot about its connection to the pulley and the support. Also shown in the embodiment of FIGS. 2 and 3, the lift system 10 includes a first tension member 70 (e.g., a cable or rope) having a first portion 80 operatively coupled to the first pulley 20. Such a lift system 10 is useful for providing a constant force to the first tension member 70 during a defined angle DA rotation of the first pulley 20. As will be understood by those skilled in the art, "constant force" or "generally constant force" means an effectively constant force, such as plus or minus 10% or less (e.g., 5% or less) of a purely constant force output.

As shown in FIGS. 2 and 3, when the first pulley 20 moves counter clockwise the biasing member 30 will deflect, thereby changing its length L and creating a moment equal to Fs*D1, where Fs is the biasing member force and D1 is the distance between the axis of rotation of the first pulley 20 and the longitudinal centerline CL of the biasing member 30. As the first pulley 20 rotates D1 will decrease until it becomes zero, as shown in FIG. 3. During this rotation, the biasing member force will increase until it reaches its maximum when D1 is zero. Accordingly, a constant moment output can be created through a defined angle DA of rotation of the first pulley 20 to provide a constant force F1 experienced by the first tension member. In some embodiments, such a constant moment output can be achieved until about 10 degrees to about 20 degrees before D1 becomes zero. Further, the first tension member 70 can be used to apply a rotating force to the first pulley. In such embodiments, the force F1 experienced by the first tension member will be generally constant throughout the first pulley movement through the defined angle. In some embodiments, the first radius will have a maximum when the biasing member has a first length and a minimum when the biasing member has a second length, the second length being the maximum biasing member length. Further, in certain embodiments, the biasing member will have a length, and the length of the biasing member continuously increases as the first radius continuously decreases during the defined angle of rotation of the first pulley.

The magnitude of the defined angle, and where it starts and ends, will depend on the size of the first pulley, the length of the biasing member at rest, and the distance from where the biasing member is attached to the support to the first pulley. In some embodiments, the defined angle is less than about 180 degrees. In other embodiments, the defined angle is less than about 135 degrees. In yet other embodiments, the defined angle is less than about 90 degrees. In some embodiments, the defined angle is less than 45 degrees. In yet other embodiments, the defined angle is less than about 30 degrees. In some embodiments, the defined angle is about 15 degrees.

Figure 4:
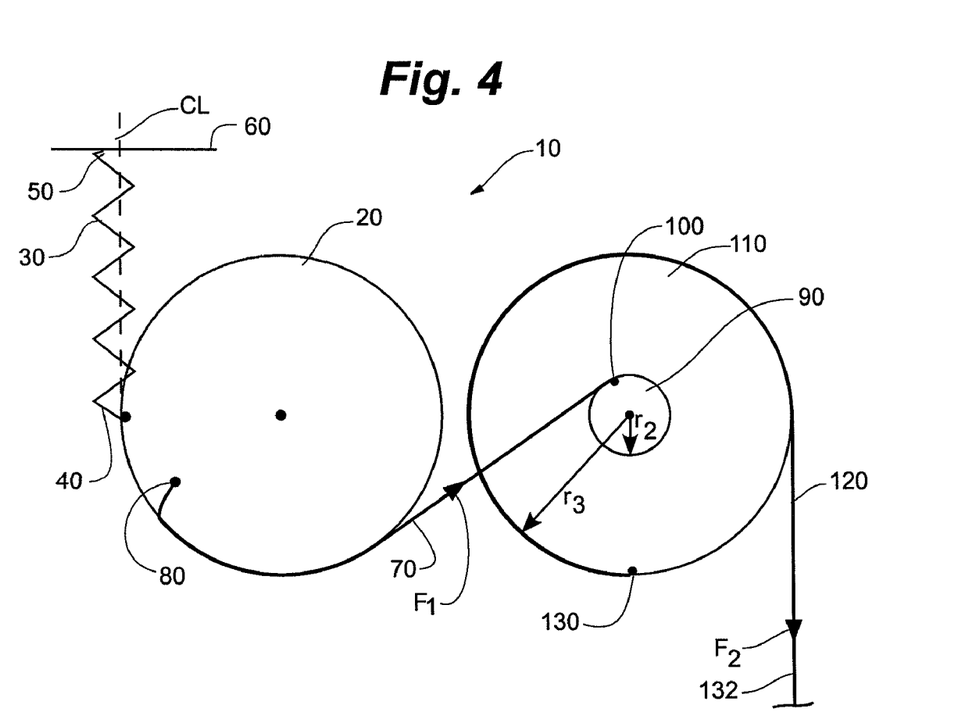
FIG. 4 shows a top plan view of a lift system in accordance with an embodiment of the invention.
Figure 5:
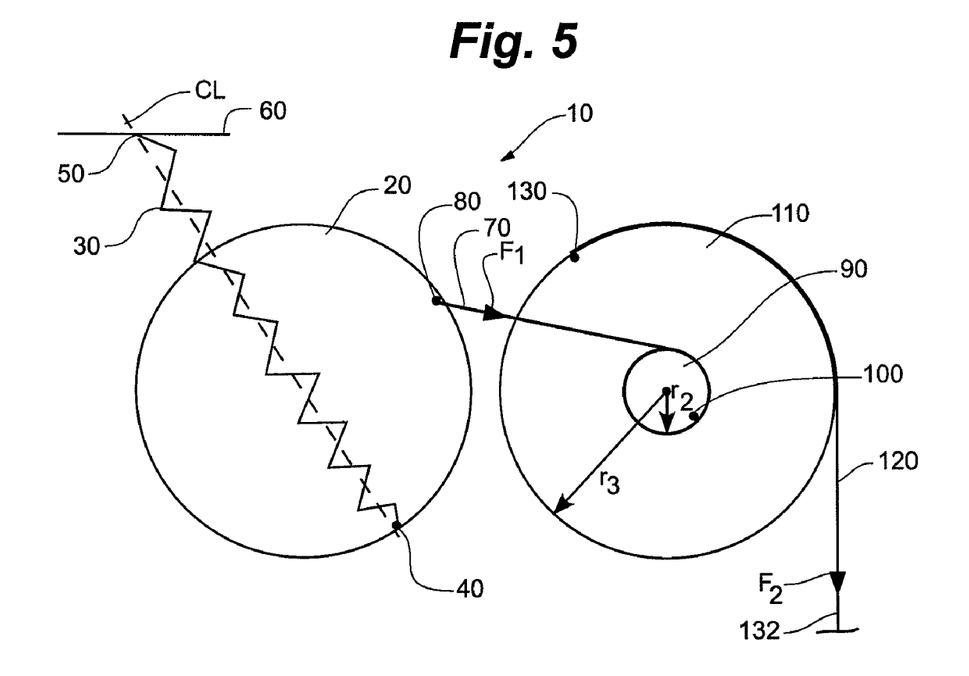
FIG. 5 shows the lift system of FIG. 4 in a second position in accordance with an embodiment of the invention.

In some embodiments, as shown in FIGS. 4 and 5, the lift system 10 in configured to increase the range of travel of a lifted object, such as a display, compared to what is provided by the defined angle DA. For example, the lift system 10 can include a second pulley 90 with a radius r2 operatively coupled to the first pulley 20 via a second portion 100 of the first tension member 70. In some embodiments, as shown in FIGS. 4 and 5, the second pulley 90 is operatively coupled to a third pulley 110 having a radius r3. In certain embodiments, the second pulley and third pulley are integrally formed with one another. Further, the second pulley and third pulley can have coaxial axes of rotation. In some embodiments the second pulley and third pulley are vertically offset from one another about a common axis of rotation.

As shown in FIGS. 4 and 5, the radius r2 of the second pulley 90 can be less than the radius r3 of the third pulley 110. In some embodiments, the third pulley radius is at least about twice the length of the second pulley radius. In certain embodiments, the third pulley radius divided by the second pulley radius defines a ratio, the ratio being greater than about two (e.g., greater than about 3).

In some embodiments, the third pulley 110 has a second tension member 120 with a first portion 130 operatively coupled thereto. The force F1 described above may be transferred to the second pulley 90 via first tension member 70. When the second pulley 90 turns a full turn, the third pulley 110 will rotate a full turn too, thereby magnifying the range of motion of a second portion 132 (and any object associated therewith) of the second tension member 120 as the first pulley 20 moves through the defined angle. Since force F1 is a generally constant force through the defined angle, force F2 will also be generally constant through this angle. Accordingly, an object, such as a display, associated with the second portion of the second tension member can provide a balancing force generally equal to F1. Such a display will be settable, easily maneuverable, and infinitely adjustable along the range of travel.

Although FIGS. 2-5 are referred to as a "top plan" views, it should be noted that designation is only for purposes of discussion, and that embodiments of the lift system may be orientated in any suitable fashion, including vertical and horizontal. Further, embodiments of the lift system may also be configured to lift an object in any direction, including vertical and horizontal.

Figure 6:
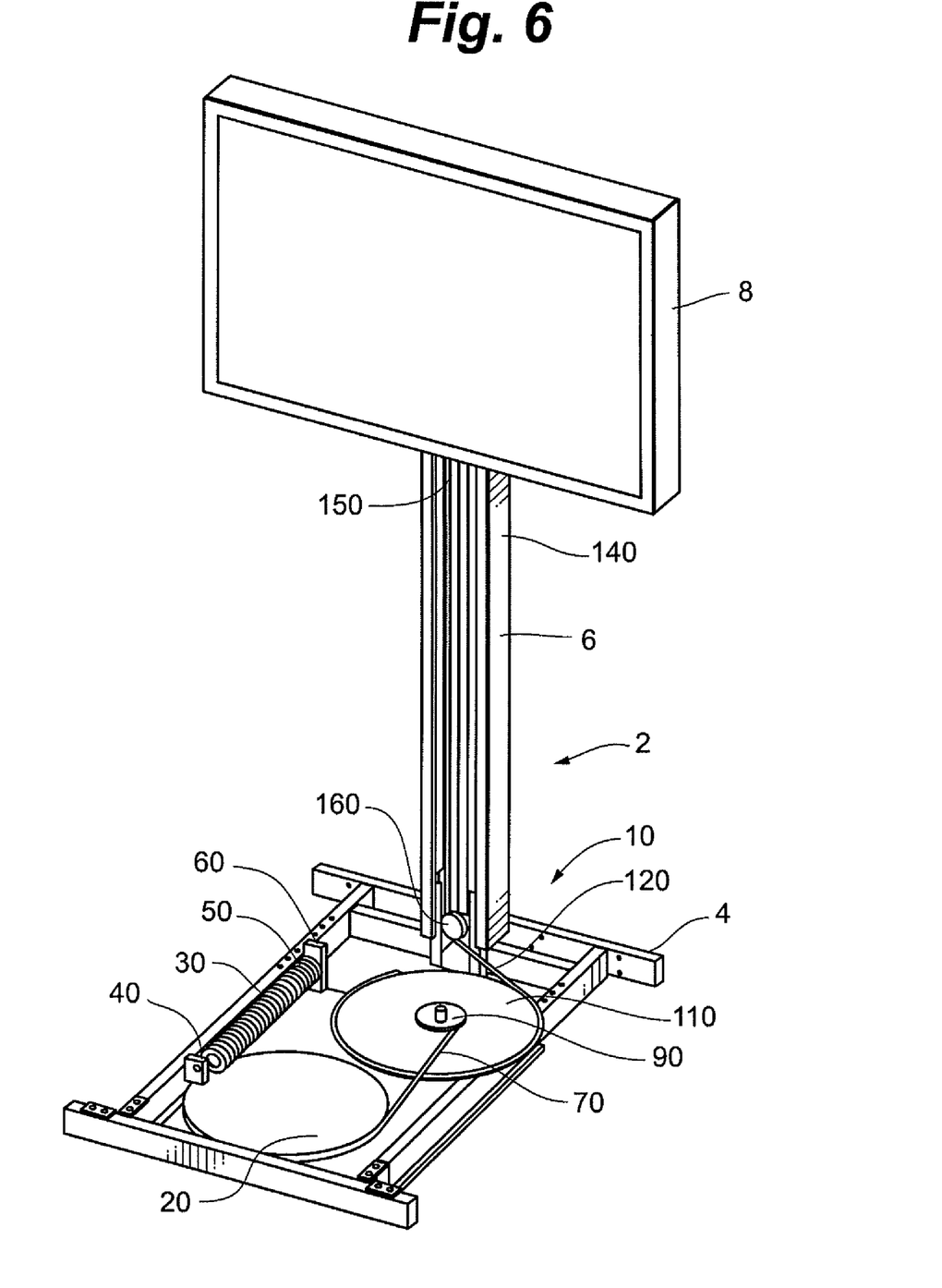
FIG. 6 shows a front perspective view of a display and stand with a lift system in accordance with an embodiment of the invention.

FIG. 6 shows an embodiment of a lift system 10 in a stand 2 supporting a display 8. As shown, in this embodiment the lift system 10 is housed in a cavity in the base 4 of the stand 2. The vertical portion 6 of the stand 2 includes an outer member 140 fixed to the base and an inner member 150 fixed to the display 8. In other embodiments, the outer member will be fixed to the display and the inner member will be fixed to the base. The inner and outer members are in sliding or rolling engagement with each other to allow the display 8 to be set at any height relative to the base within a defined range of travel. As shown, one or more pulleys 160 may be provided to route the second tension member 120 from the third pulley 110 to the vertical member 6. As the display 8 is lowered relative to the base it allows the third pulley 110 to rotate, in this example, in a clockwise direction. The second pulley 90 will also rotate in a clockwise direction. The first pulley 20 will rotate in a clockwise direction and the biasing member length L will decrease (thereby changing the biasing member force) while D1 increases to provide a continuously counterbalancing force to the display as it is moved downward through its range of motion and to provide the proper counterbalancing force to hold the display at its new position. Raising the display causes the first, second, and third pulleys to rotate in a counterclockwise direction and the biasing member length L to expand and D1 to decrease to provide a continuously counterbalancing force to the display as it is moved upward through its range of motion and in its new desired position.

Figure 7:
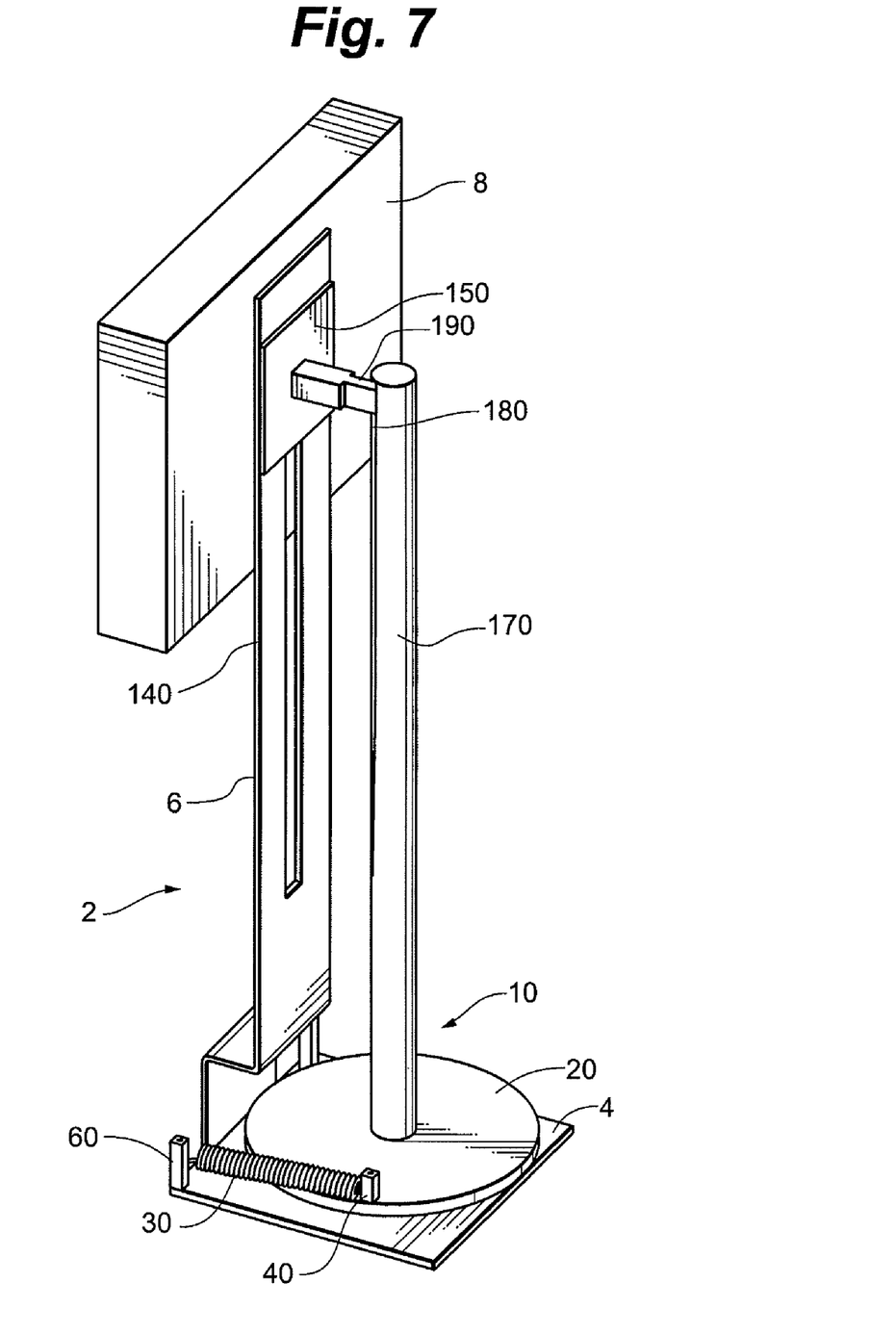
FIG. 7 shows a rear perspective view of a display and stand with a lift system in accordance with another embodiment of the invention.

Another embodiment of the invention is shown in FIG. 7. In the embodiment shown, first pulley 20 and biasing member 30 are housed in the base 4 of the stand 2. The biasing member length L (and associated biasing member force) and D1 cooperatively change together as the display is moved through its range of motion as discussed above. In the embodiment of FIG. 7, a contact member 170 (e.g., cam member) having a contact surface 180 (e.g. camming surface) is connected to the first pulley 20. In some embodiments, the contact member has a longitudinal axis that coincides with the axis of rotation of the first pulley. As shown, an engagement member 190 (e.g., cam engagement member) useful for engaging the contact surface can be coupled with the display. In some embodiments, the contact surface takes the form of a helical groove. In other embodiments, the contact surface takes the form of a generally serpentine groove in the contact member to provide a camming surface. Such embodiments are useful for more closely approximating a pure constant force output. In certain embodiments, the engagement member includes a rigid protrusion that rides within the groove. In the embodiment shown, as the display is moved downwardly relative to the base the engagement member rides within the groove and interacts with the contact surface. The interaction causes the contact member and the first pulley to move in a counterclockwise direction. As the first pulley rotates the biasing member length L will increase while D1 decreases to provide a continuously counterbalancing force to the display and it is moved downward through its range of motion and to provide the proper counterbalancing force to hold the display at its new position. Raising the display causes the cam member to rotate in a clockwise direction and the biasing member length L to decrease and D1 to increase to provide a continuously counterbalancing force to the display as it is moved upward through its range of motion and in its new desired position.

Embodiments of the invention also include methods of making and using the various embodiments of lift systems described above. For example, in use, a lift system as described above can be provided. When a user desires to change the position of the display, such as by raising it, the user can manually engage the display and apply a force in the vertical direction. In some embodiments, such a movement will cause the third pulley 110 to rotate. The second pulley 90 attached to the first tension member 70 will rotate in the same direction. In other embodiments, rotation of a contact member will cause the first pulley to rotate. The first tension member 70 will cause the first pulley 20 to rotate through its defined angle, causing an extension of the biasing member. Because the moment Fs*D1 is constant as the first pulley 20 moves through its defined angle as described above, the resistance force experienced by the user during the repositioning is relatively constant. In addition, because the force is counterbalanced, the user will be able to reposition the display using a force equal to a fraction of the weight of the display.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention.

What is claimed is:

1. A method of changing a position of a display, comprising engaging a display and applying a force to the display, the display being operatively coupled to a lift system comprising a first pulley having an axis of rotation, a biasing member having a biasing member force dependent upon its length, a centerline, and a first portion operatively coupled to the first pulley, a first radius extending between the centerline of the biasing member and the axis of rotation, the first radius continuously changing when the first pulley rotates and the first radius having a value of zero when the biasing member force is at a maximum to create a constant moment output, and a first tension member having a first portion operatively coupled to the first pulley, the constant moment output providing a constant force to the first tension member during a defined angle of rotation of the first pulley.

2. A stand and display in combination, comprising:
 a display;
 a stand supporting the display, the stand having a base and a vertical member coupled to the base, the vertical member having an inner member and an outer member in sliding or rolling engagement, one of the inner and outer members functionally coupled to the base and the other of the inner or outer members functionally coupled to the display;
 a lift system disposed within the stand, the lift system comprising a first pulley having an axis of rotation, a biasing member having a biasing member force dependent upon its length, a centerline, and a first portion operatively coupled to the first pulley, a first radius extending between the centerline of the biasing member and the axis of rotation, the first radius continuously changing when the first pulley rotates and the first radius having a value of zero when the biasing member force is at a maximum to create a constant moment output, and a first tension member having a first portion operatively coupled to the first pulley, the constant moment output providing a constant force to the first tension member during a defined angle of rotation of the first pulley to counterbalance the display.

3. The lift system of claim 2, wherein a second portion of the first tension member is functionally coupled to the display.

4. The lift system of claim 2, further including a second pulley having a second pulley radius operatively coupled to the first pulley via a second portion of the first tension member, the second pulley being operatively coupled to a third pulley having a third pulley radius, the third pulley radius being larger than the second pulley radius, the third pulley having a second tension member with a first portion operatively coupled thereto, the lift system being configured to magnify the range of motion of a second portion of the second tension member as the first pulley moves through the defined angle.

5. The lift system of claim 4, wherein the second pulley and third pulley have coaxial axes of rotation.

6. The lift system of claim 4, wherein the third pulley radius is at least twice the length of the second pulley radius.

7. The lift system of claim 4, wherein the second portion of the second tension member is operatively coupled to the display.

8. The lift system of claim 7, wherein the display is a flat panel display.

9. The lift system of claim 2, further including a contact member having a contact surface connected to the first pulley and an engagement member useful for engaging the contact surface.

10. The lift system of claim 9, wherein the contact surface includes a generally helical groove in the contact member and the engagement member includes a rigid protrusion that rides within the groove.

11. The lift system of claim 9, wherein the contact member includes a camming member having a camming surface and the engagement member is useful for engaging the camming surface.

12. The lift system of claim 2, wherein the defined angle is less than 180 degrees.

13. The lift system of claim 2, wherein the defined angle is less than 90 degrees.

14. The lift system of claim 2, wherein the defined angle is less than 30 degrees.

15. The lift system of claim 2, wherein the biasing member includes a spring.

16. The lift system of claim 15, wherein the spring includes an extension spring.

17. The combination of claim 2, wherein the base defines a cavity to house the biasing member and first pulley.

18. The lift system of claim 2, wherein the first portion of the first tension member is directly connected to the first pulley.

* * * * *